US007785692B1

(12) United States Patent
Siegel et al.

(10) Patent No.: US 7,785,692 B1
(45) Date of Patent: *Aug. 31, 2010

(54) FLUID HANDLING FLOORMAT

(75) Inventors: David Siegel, Warren, NJ (US); Richard S. Siegel, Warren, NJ (US)

(73) Assignee: David R. Siegel, Warren, NJ (US)

( * ) Notice: Subject to any disclaimer, the term of this patent is extended or adjusted under 35 U.S.C. 154(b) by 427 days.

This patent is subject to a terminal disclaimer.

(21) Appl. No.: 11/935,117

(22) Filed: Nov. 5, 2007

Related U.S. Application Data

(63) Continuation-in-part of application No. 11/210,808, filed on Aug. 25, 2005, now Pat. No. 7,291,376, which is a continuation-in-part of application No. 10/911,935, filed on Aug. 4, 2004, now abandoned.

(51) Int. Cl.
*B32B 3/30* (2006.01)

(52) U.S. Cl. ......................... 428/99; 428/156; 428/158; 428/159; 428/160; 428/167

(58) Field of Classification Search ................... 428/99, 428/156, 158, 159, 160, 167
See application file for complete search history.

(56) References Cited

U.S. PATENT DOCUMENTS

| | | | | |
|---|---|---|---|---|
| 2,005,659 | A | 6/1935 | Matteson | |
| 4,765,670 | A | 8/1988 | Jackson | |
| 4,811,937 | A | 3/1989 | Rothman | |
| 5,028,468 | A | 7/1991 | Taylor | |
| 5,080,956 | A | 1/1992 | Smith | |
| 6,102,073 | A | 8/2000 | Williams | |
| 6,245,697 | B1 | 6/2001 | Conrad et al. | |
| 6,568,419 | B1 | 5/2003 | Robinson et al. | |
| 6,719,348 | B1 | 4/2004 | Song | |
| 6,726,190 | B2 | 4/2004 | Malpass et al. | |
| 7,291,376 | B1 * | 11/2007 | Siegel et al. | 428/99 |
| 2002/0092563 | A1 | 7/2002 | Robinson | |
| 2003/0068463 | A1 | 4/2003 | Polley | |
| 2003/0232175 | A1 | 12/2003 | Zahler | |
| 2004/0091674 | A1 | 5/2004 | Altshuler | |

* cited by examiner

*Primary Examiner*—Alexander Thomas
(74) *Attorney, Agent, or Firm*—Thomas L. Adams

(57) ABSTRACT

A floormat arranged to shed fluids has a topside and an underside. The floormat is placed where a user is expected to stand during a procedure. Fluids released during the procedure are allowed to fall onto and be shed off the floormat before being removed. The floormat may be discarded before starting another procedure. The mat is formed, at least in part, of compressible and resilient material. The topside of the mat has a spaced plurality of channels. In one instance, each of the channels has a floor sloping in opposite directions from a central peak. In another instance, the mat has a tapered apron bordering a central section that is convexly crowned to shed fluids. In other embodiments the topside of the central region is substantially flat except for the spaced plurality of channels. The floormat may be placed where an operator is expected to stand during the procedure. Fluids that fall onto the floor mat are shed therefrom and then removed. The floormat is discarded before starting another procedure.

12 Claims, 4 Drawing Sheets

FLUID HANDLING FLOORMAT

CROSS REFERENCES TO RELATED APPLICATIONS

This application is a continuation-in-part application of U.S. patent application Ser. No. 11/210,808, filed 25 Aug. 2005 (now U.S. Pat. No. 7,291,376), which is in turn a continuation-in-part of U.S. patent application Ser. No. 10/911,935, filed 4 Aug. 2004, now abandoned, the contents of both are hereby incorporated by reference herein.

BACKGROUND OF THE INVENTION

1. Field of the Invention

The present invention relates to floormats and methods for handling fluids released during surgery with a floormat.

2. Description of Related Art

During surgery various fluids are released, which often fall onto the floor of an operating room. Not only can blood and other body fluids spill onto the floor, some procedures irrigate a surgical site with copious amounts of saline solution, which is then allowed to spill onto the floor.

It is highly desirable to quickly get these fluids away from the surgeon's feet to reduce the risk of slipping. Also, fluids released during surgery can spread infections and this risk is greatly enhanced the longer the surgeon stands or walks in these fluids. In the past surgical assistants have used existing surgical suction devices to vacuum these fluids. However, this method is not only inefficient but produces much distracting noise. Other known methods include placing towels or blankets on the fluid puddles, but this is time-consuming and requires the surgeon to step away and then stand on soaking material, which is both uncomfortable and increases the risk of tripping, as well as infection.

Various other environments exist where a person may be standing during a procedure and where fluid may be spilled in the vicinity of where the person stands. For example, boaters may stand on a deck that is periodically sprayed or splashed by seawater. In some cases the boater may need to operate, repair or clean equipment and seawater may drain from the equipment during the procedure.

Also fishermen and hunters may need to clean, dress and prepare their catch or kill. In such cases fluids may run onto the ground or floor due to the release of body fluids or water used to clean the work site. Butchers will experience a similar situation when cutting and dressing meat at a butcher shop.

In addition, many technicians and hobbyists in the automotive field, gun repair/maintenance field, or other mechanical repair fields may spill fluids used to clean parts or may spill fluids used by the machinery (hydraulic fluid, coolant, brake fluid, transmission fluid, refrigerant, etc.)

Ordinary consumers may also deal with spills in the vicinity of where the person stands. Spilled fluids are often encountered when preparing foods or using the sink in a kitchen. In addition, various cleaning or repair tasks conducted throughout the house, yard or garden may involve fluid spills as well.

In U.S. Pat. No. 4,765,670 an auto mat has a number of grooves that all slope in the same direction to fill a sump formed along one edge of the mat. The reference recognizes that this sump can overflow and therefore suggests connecting the sump to a drainage tank.

In U.S. Pat. No. 6,719,348 flooring 10 is installed over a number of storage compartments 42 in the back of a motor vehicle. The top of the flooring has a number of grooves 16 arranged in a herringbone pattern and feeding two central channels 14. Fluids falling on the flooring 10 flow through grooves 16 and channels 14 into a sump 40 built into the rear of the vehicle.

In U.S. Patent Application 2002/0092563 a crowned, non-absorbent splash pad 42 is placed on a base with raised center 26 and radial drainage channels 28, which feed into lower peripheral channel 30. Fluid-removing suction tubing 50 is connected to the lower channel 30. The base is not meant to support the weight of a person.

In U.S. Patent Application 2003/0068463 a disposable, surgical floormat can be affixed to a surface using adhesive material 28 attached to a carrier sheet 26 and protected with removable liner sheet 29. Cover 60 provides a non-slip, water-resistant surface, while layers 30, 40, 50 gradually decrease in overall length and width, creating a "pyramid" effect.

In FIG. 6 of U.S. Patent Application 2004/0091674 a corrugated anti-fatigue mat has drainage holes 240.

In U.S. Pat. No. 4,811,937, operating room personal stand on a floor through which fluids pass to a slightly inclined fluid receiving surface. Fluids are directed into a trough, and evacuated through a drain which is connected to a suction device.

In U.S. Pat. No. 6,102,073 a porous, flexible mat 34 rests atop a grid 32. The grid 32 is supported by a base 12 with studs 30, which defines a floor 20 formed of three sloped segments 22, 24, and 26 along which fluids will flow. Fluids directed onto the mat will flow onto the floor 20, where they will be withdrawn through fluid outlet 28 by a suitable suction device.

In U.S. Pat. No. 6,568,419, a broad, shallow vessel 28 is used to collect fluids that pass through a foot pad 24 made of a sturdy, non-woven mat 54 that operating room personnel stand on. Fluids are removed from the vessel 28 by a drainage system 26 and stored in a collection tank 80.

In U.S. Patent Application 2003/0232175 a floor mat 100 has four folding panels 110, 120, 130, 135 with fluid-capturing recesses 290 and beveled edges 295.

In U.S. Pat. No. 6,726,190, suction cups 26 on the bottom surface 14 of a mat 20 restrict movement on the floor, and fluids can pass into holes 30 in the mat.

In U.S. Pat. No. 5,080,956 a non-porous sheet 30 made of bubble-pack material channels liquids 34 onto absorbent sheet 20.

In U.S. Pat. No. 5,028,468 a thin plastic layer 16 is inserted into an envelope 12 with an absorbent surface 14 to provide an anti-fatigue surface for surgical personnel and a means of floor protection from fluids. The thin plastic layer 16 can be removed and re-used, while the envelope 12 is discarded after each use.

In U.S. Pat. No. 6,245,697, protective, flexible mats are used for absorbing liquids, and may contain non skid material.

SUMMARY OF THE INVENTION

In accordance with the illustrative embodiments demonstrating features and advantages of the present invention, there is provided a method for handling fluids released during surgery with a floormat having a plurality of sloped channels. The method including the step of placing the floormat where a surgeon is expected to stand during surgery. Another step is allowing fluids that fall onto the floormat to be shed off the floormat. The method includes the step of removing fluids shed off the floormat. Another step is discarding the floormat before starting another surgery.

In accordance with another aspect of the invention, a method is provided for handling fluids released during a procedure with a floormat having a central region with a plurality of sloped channels. The method includes the step of placing the floormat where an operator is expected to stand during the procedure. Another step is allowing fluids that fall onto the floormat to be shed off the floormat. The method includes the step of removing fluids shed off the floormat. Another step is discarding the floormat before starting another procedure.

In accordance with yet another aspect of the invention, a floormat is arranged to shed fluids. The floormat has a topside and an underside and is formed, at least in part, of compressible and resilient material. The topside has a spaced plurality of channels. The channels have open ends that drain fluid off the floormat without encountering a rising elevation to impede drainage. The topside has a central region and a border region. The central region occupies most of the topside and is substantially flat throughout except for the channels. Each of the channels has in the central region a floor sloping in opposite directions from a central peak.

By employing equipment and methods of the foregoing type, fluids released during surgery can be handled in a highly effective and efficient manner. In one embodiment a rectangular mat with rounded corners is made of an elastomeric, material for reducing fatigue and increasing comfort.

In one embodiment the surgical mat has a relatively flat topside, except for a number of longitudinal channels. The floors of these channels are sloped away from a central peak so that fluids released during surgery flow into the channels and away from the center of the mat. For this embodiment, the mat has rounded corners and is formed of a compressible and resilient material to reduce a surgeon's fatigue.

In another embodiment, the mat has a crowned central section, which is integral with a tapered apron that encircles the central section. The apron is formed with a number of shallow channels that run from the outside border of the central section to the edge of the apron.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
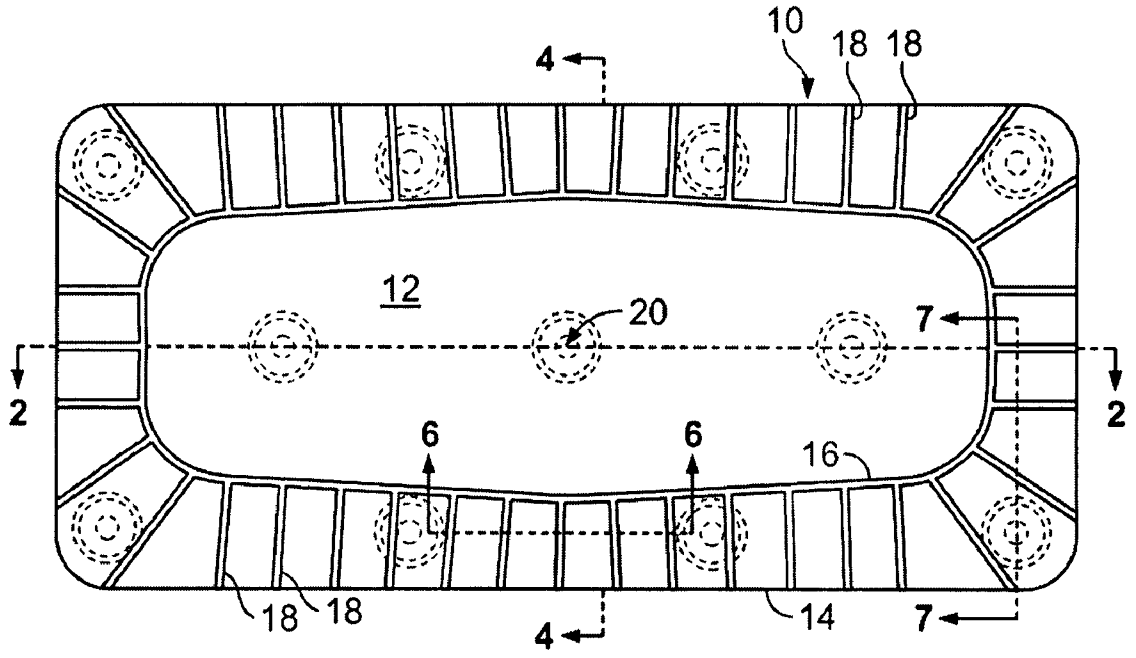
FIG. 1 is a plan view of a floormat in accordance with the present invention.
Figure 2:
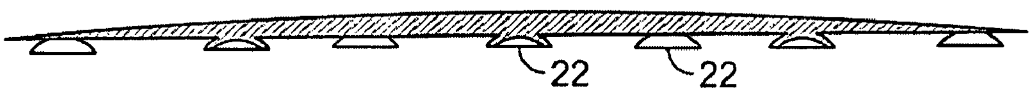
FIG. 2 is a cross-sectional view taken a long line 2-2 of FIG. 1.
Figure 3:
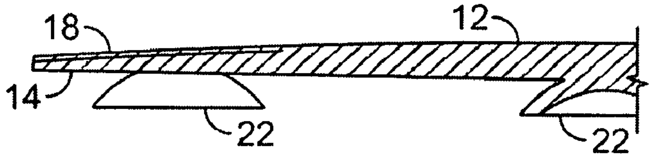
FIG. 3 is detailed, fragmentary, cross-sectional view of the left portion of the floormat of FIG. 2.
Figure 4:
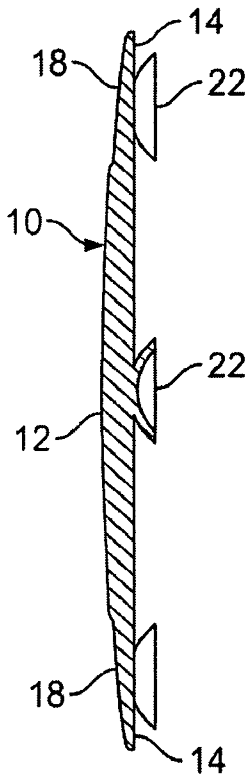
FIG. 4 is a cross-sectional view taken a long line 4-4 FIG. 1.
Figure 5:
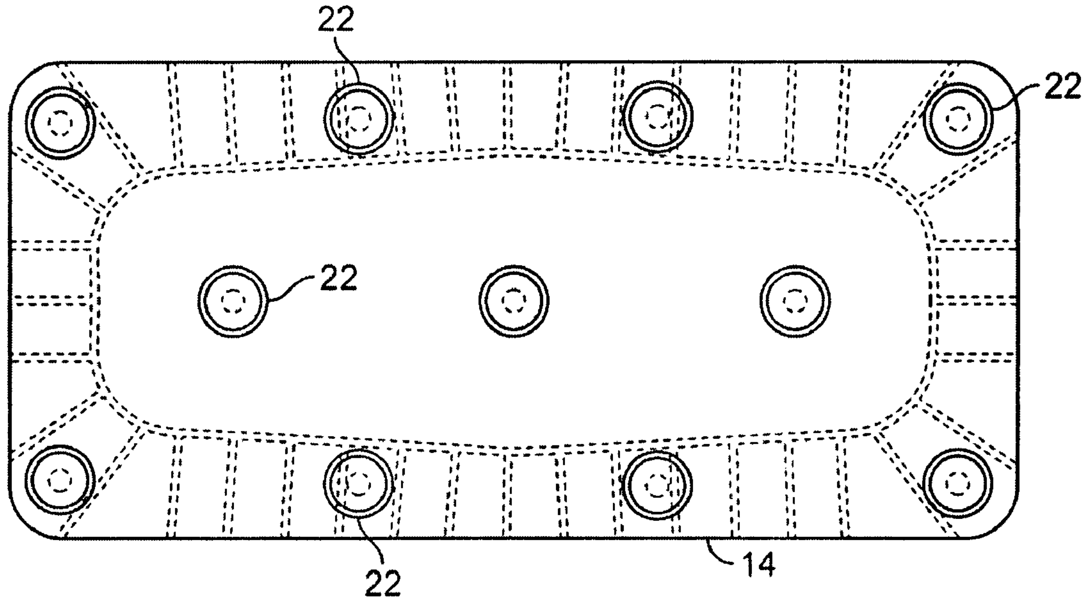
FIG. 5 is a bottom view of the mat of FIG. 1.
Figure 6:
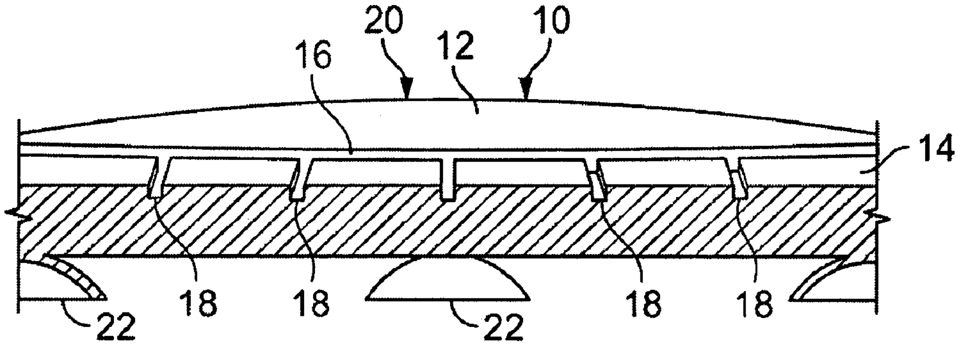
FIG. 6 is a fragmentary, cross-sectional view taken a long line 6-6 FIG. 1.
Figure 7:
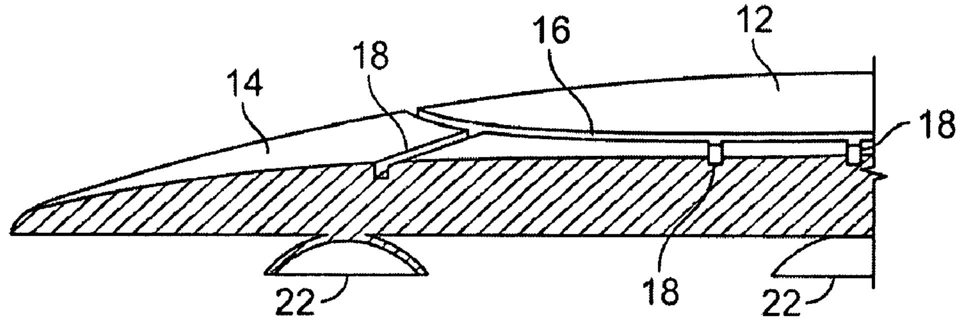
FIG. 7 is a fragmentary, cross-sectional view taken a long line 7-7 FIG. 1.

Referring to FIGS. 1-7, the illustrated floormat 10 may be made of an elastomeric material such as PVC or a rubber, either synthetic or natural. Other materials such as polyurethane foam, as well as materials commonly used in anti-fatigue mats are contemplated also. It is also desirable to make the mat material nonflammable, and to avoid allergic reactions, latex-free.

It is highly desirable to provide a mat 10 that is disposable and intended for a single use. Accordingly, the mat material need not be highly durable and wear-resistant. For such disposable models, wear resistant coatings are not contemplated. To keep mat 10 sanitary, it can be cleaned, disinfected or sterilized, as appropriate. Thereafter mat 10 can be rolled up and sealed with a plastic shrink wrap material before shipment.

Mat 10 as shown is 36 inches long (0.9 m) and 17 inches (0.4 m) wide, although other overall dimensions are contemplated for other embodiments. Mat 10 has a central section 12 encircled by an annular, tapered apron 14. Apron 14 is about 3.5 inches (8.9 cm) wide at the centers of its four sides and has a slope there of about 4 degrees.

Central section 12 is crowned, that is, it slopes downwardly in every direction away from its apex 20, which is located at the center of the mat 10. In one embodiment the radius of curvature along the longitudinal centerline of the central section 12 is about 260 inches (6.6 m). In that embodiment the radius of curvature along a transverse centerline is about 58 inches (1.5 m). The advantages of crowning as described hereinafter will occur when the radius of curvature in central section 12 is less than a maximum of 500 inches (1.3 m). In one embodiment central section 12 has a thickness or height of 0.75 inch (1.9 cm) at its apex 20. It is desirable to have the height or thickness at apex 20 in the range of 0.5 to 1.5 inches (1.3 to 3.8 cm). With a thickness at apex 20 of about 0.75 inch (1.9 cm), the height or thickness of the central section 12 at its perimeter may be about 0.35 inch (9 mm), but for various other embodiments it will be desirable to keep the thickness at the perimeter in a range of 0.2 to 0.6 inch (5 to 15 mm).

The margin between central section 12 and apron 14 is marked by an optional, annular groove 16. The groove 16 runs parallel to the short sides and about 4 degrees to the long sides of mat 10 except at its rounded corners. Projecting outwardly and transversely from groove 16 across apron 14 are a number of channels 18. The width and depth of channels 18 are similar to that of groove 16, although they can be sized differently in other embodiments. In one embodiment channels 18 were 0.25 inch (6 mm) wide and 0.06 inch (1.5 mm) deep, although this dimension can vary in alternative embodiments. It is advantageous to have these channels 18 in a range of ⅛ through ½ inch (3 through 13 mm) wide and 0.03 to 0.25 inch (0.7 to 6 mm) deep. In most embodiments, central section 12 and apron 14 will be integral components that are molded at the same time to form a common core.

A number of integral, molded suction cups 22 project from the underside of mat 10. In this embodiment suction cups 22 are molded simultaneously with the main body of the mat, that is, with central section 12 and apron 14. Suction cups 22 may be 0.5 to 1.5 inches (1.3 to 3.8 cm) in diameter, although other sizes are possible. In this embodiment three equidistant suction cups 22 are placed along the centerline on the underside of central section 12. On either side of this centerline two sets of four equidistant suction cups 22 are placed in lines parallel to the centerline to form a staggered, diamond pattern of suction cups. In other embodiments a different number of suction cups may be laid in a different pattern.

In some embodiments, suction cups will not be employed but the underside of the mat can have a nonslip surface. In some cases the mat material will itself be inherently nonslip. In other embodiments the underside may be roughened or may have a large number of nubs that grip the floor. Alternatively, the underside of the mat may be finished with a tacky substance or an adhesive. Alternatively, the underside can be fitted with strips whose exposed face is coated with an adhesive. Moreover, the top side of the mat 10 (section 12 and apron 14) can have a nonslip finish as well, which will typically be accomplished by providing a roughened surface.

Various embellishments and decorations are contemplated for mat 10. In keeping with customary colors for operating rooms, mat 10 can be colored blue either by incorporating a die or by applying a colored coating to the mat. In some embodiments, central section 12 and apron 14 may be colored differently. Also, advertising logos may be placed at various positions on mat 10. For example, a drug brand may be advertised in large letters on the central section 12.

Figure 8:
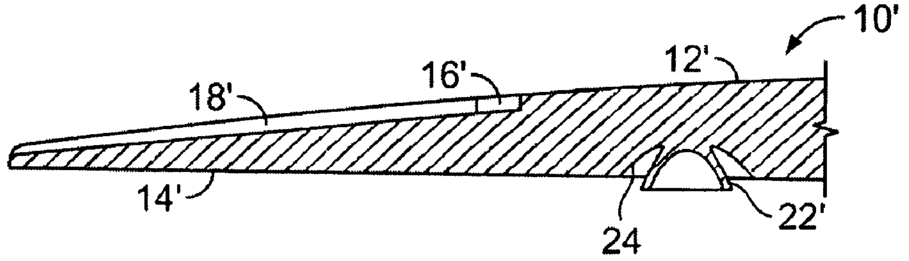
FIG. 8 is a detailed, fragmentary, cross-sectional view of a portion of a floormat with a recessed suction cup that is an alternate to that of FIG. 2.

Referring to FIG. 8, a modified mat 10' is arranged in a manner similar to that shown in FIG. 1. In this Figure, components corresponding to those previously illustrated in FIG. 1 will have the same reference numerals but marked with a prime ('). In particular, suction cup 22' has a shape similar to that previously illustrated but is located in a recess 24 on the underside of mat 10'. Suction cups 22' can be arranged in a pattern similar to that shown for the mat 10 of FIG. 1.

Figure 9:
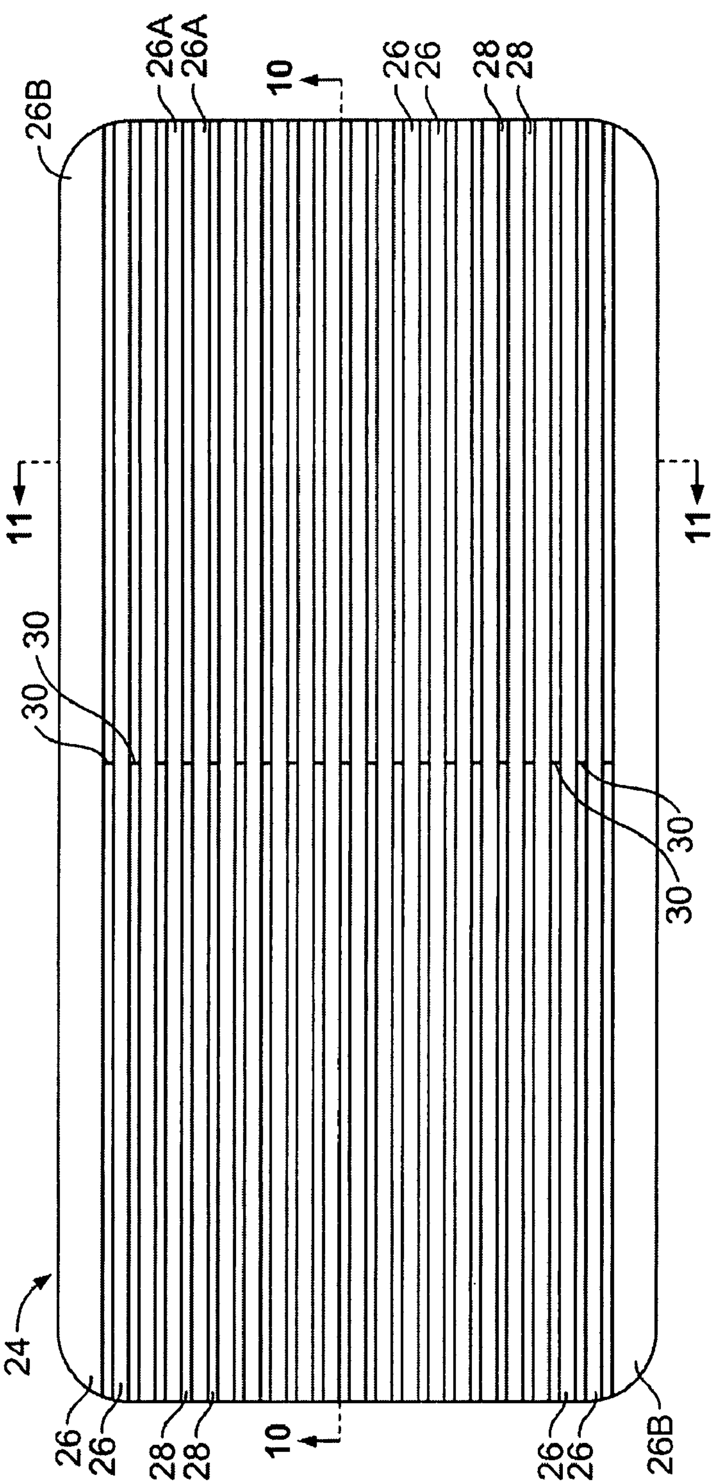
FIG. 9 is a plan view of a floormat that is an alternate to those described above.
Figure 10:
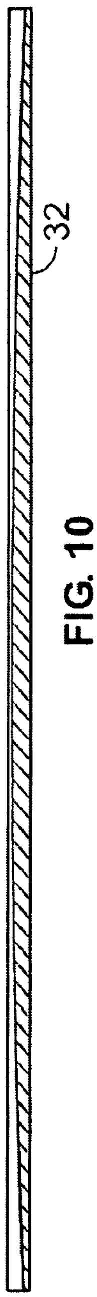
FIG. 10 is a sectional view taken long line 10-10 of FIG. 9; the FIG. 11 is a cross-sectional view taken long line 11-11 of FIG. 9 of a fragment of the floormat.
Figure 11:
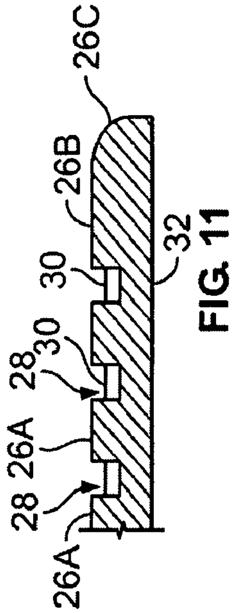

Referring to FIGS. 9-11, another floormat 24 is illustrated, again having rounded corners. Floormat 24 may be made of material similar to that described above in connection with the other embodiments. In this embodiment the topside 26 is relatively flat except for the number of longitudinal channels 28. While twenty such channels are illustrated, other embodiments can have a greater or lesser number. Regions 26A of topside 26 are located between channels 28. Two border regions 26B are located along the longer sides of mat 24 to the outside of the channels 28.

The floors of each of the channels 28 have a central peak 30 equidistant from the channel ends for dividing any fluids that enter the channels. The channels 28 are illustrated with a rectangular cross-section, although in other embodiments the cross-section may be semicircular, oval, polygonal, etc. Addition, the width of the channels may vary along their lengths, in some embodiments.

The regions 26A and 26B are all at substantially the same elevation except for some rounding of the corners along the edges of floormat 24. See for example, rounded corner 26C. In some embodiments a central region may be encircled by a sloping border region running along all four sides of floormat 24 to avoid creating an abrupt step up.

Excluding rounded corners or a sloping border region, grooves 26 have a depth that increases for directions away from central peaks 30. Moreover, the elevation of the floors of grooves 26 decline for directions away from central peaks 30. Accordingly, fluid entering channels 28 flows away from the central peak 30 to the channel ends and thus off the floormat 24.

In one embodiment floormat 24 has an overall length of 38 inches (0.97 m) and an overall width of 19 inches (0.48 m). In this embodiment the overall thickness of floormat 24 (measured at regions 26A and 26B of topside 26) was ½ inch (12.7 mm). The grooves 28 are ¼ inch (6.4 mm) wide and are distributed with a groove to groove spacing of ¾ inch (19 mm). The depth of the grooves 28 varied linearly from a minimum of ⅛ inch (3.2 mm) at central peaks 30 to a maximum of ⅜ inch (9.5 mm) at the outlet ends. It will be appreciated that these dimensions and proportions can be varied for other embodiments.

The foregoing mat 24 may be made with nonslip surfaces in the manner described above for the other embodiments. Also, in some embodiments the underside 32 of the mat 24 may be finished with a tacky adhesive as described for the other embodiments, in order to keep the mat in place. Alternatively, the underside 32 of the foregoing mat 24 can have suction cups similar to those described above.

To facilitate an understanding of the principles associated with the foregoing apparatus, the operation of the embodiment of FIGS. 1-7 will be briefly described. The above described mat 10 may be removed from its shrink wrap package (not shown) and laid on the floor next to a location where a user or other personnel are expected to stand. Stepping on mat 10 will cause the suction cups 22 to grip the floor and hold the mat 10 in place.

Mat 10 is made of resilient, material that will increase comfort, reduce fatigue and, in general, ease the burden of standing during a long procedure. In addition, while the apron 14 is thinner, it is still sufficiently thick to provide a comforting, anti-fatigue effect. Also, channels 18 (as well as groove 16) are relatively small and do not substantially degrade the cushioning, anti-fatigue effect on apron 14. Also, these channels 16 and 18 are sufficiently small to avoid any risk of tripping.

During the procedure fluids may fall onto mat 10. Fluids falling on central section 12 will tend to shed from the surface and drain through channels 16 and 18. Likewise, fluids falling on apron 14 will shed fluids directly or through channels 18. Consequently, the user will have a dry place to stand with less chance of contaminated, corrosive or infected fluids seeping through any foot covering worn by the user. Also, a dry surface will reduce the chance of slipping and falling.

Fluids shed from mat 10 will drain onto the floor but at locations where the user is normally not standing. If the user is expected to work in several locations, multiple mats can be placed at those sites. Of course, mats can be provided for other assistants in the vicinity.

During a procedure, any fluids that drain off the mat 10 can be cleaned up with either a suction device or by throwing towels on the fluids, although in many instances these fluids will remain on the floor until completion of the procedure.

After the procedure is completed, personnel can remove the mat 10, place it into a leakproof disposal bag and discard the mat. Often, the mat will require special handling since it may contain material considered corrosive or biological waste representing a danger of infection or contamination.

The operations of the floormat 24 of FIGS. 9-11 will be the same except that draining fluids will move away from the central peaks 30 and drained to the right and left edge of the floormat. Basically, channels 28 will shed fluids in either direction from peak 30. Furthermore, the top side 26 is relatively flat and in this embodiment presents a horizontal surface (except for the channels 26 between regions 26A). This flat surface increases the user's sense of balance and reduces fatigue.

The foregoing mats may be used in an operating room where a surgeon must often deal with fluids spilling in the vicinity where the surgeon is standing. Many surgical procedures involve the discharge of bodily fluids or the washing or irrigation of various sites, all tending to result in spills, either intended or unintended. The foregoing drainage tends to keep the surgeon's feet dry and reduce the danger of slipping and falling. Also spills occurring in an operating room may represent a biohazard and care must be taken to avoid seepage through footwear making contact with the skin. While removing fluid from the vicinity is an important consideration, preventing user fatigue is also important. The resilient surface presented by the foregoing floormat will reduce user fatigue, while simultaneously dealing with spilled fluids.

Various other environments exist where a person may be standing during a procedure and where fluid may be spilled in the vicinity of where the person stands. For example, boaters may stand on a deck that is periodically sprayed or splashed by seawater. In some cases the boater may need to operate, repair or clean equipment and seawater may drain from the equipment during the procedure.

Also fishermen and hunters may need to clean, dress and prepare their catch or kill. In such cases fluids may run onto the ground due to the release of body fluids or water used to clean the work site. Butchers will experience a similar situation when cutting and dressing meat at a butcher shop.

In addition, many technicians and hobbyists in the automotive field, gun repair/maintenance field, or other mechanical repair fields may spill fluids used to clean parts or may spill fluids used by the machinery (hydraulic fluid, coolant, brake fluid, transmission fluid, refrigerant, etc.)

Ordinary consumers may also deal with spills in the vicinity of where the person stands. Fluids are often encountered when preparing foods or using the sink in a kitchen. In addition, various cleaning or repair tasks conducted throughout the house or the yard may involve fluid spills as well.

In all these instances one wishes to avoid standing in spilled fluids. In some cases avoiding the discomfort of wet feet is an important consideration, but in other instances the fluids involved can be hazardous or deleterious. For example, some fluids can be slippery and increase the danger of falling. Other fluids may be corrosive and can damage either footwear or the foot itself.

It is appreciated that various modifications may be implemented with respect to the above described, preferred embodiments. While the illustrated grooves and channels are shown having a rectangular cross-section, in some embodiments their cross-section may be rounded, triangular, polygonal, oval, or shaped otherwise. Also in some embodiments the channels may be so close together that a cross-section through the mat reveals a sinuous or sawtooth pattern. Moreover, in some embodiments the path of the channels may be curved. In some cases, the paths of the channels may be in the form of nested arches or may be arranged in a herringbone pattern. In addition, the mats in some embodiments may have perforations that allow the fluids to pass directly through the mat. Furthermore, in embodiments like that of FIG. 1, not all of the channels will reach the border of the central section, and some channels may run across just the apron. Moreover, instead of a central section surrounded on all sides by an apron, in some embodiments the central section may be a center strip running across the full length of the mat and bordered on either side by a separate pair of tapered aprons.

Obviously, many modifications and variations of the present invention are possible in light of the above teachings. It is therefore to be understood that within the scope of the appended claims, the invention may be practiced otherwise than as specifically described.

The invention claimed is:

1. A floormat arranged to shed fluids:

(a) said floormat having a topside and an underside and being formed, at least in part, of compressible and resilient material; and (b) said topside having a spaced plurality of channels, the channels having open ends that drain fluid off the floormat without encountering a rising elevation to impede drainage, said topside having a central region and a border region, said central region occupying most of said topside and being substantially flat throughout except for the channels, each of the channels having in the central region a floor sloping in opposite directions from a central peak.

2. A floormat according to claim 1 wherein said channels for most of their lengths become deeper for positions further from the central peak.

3. A floormat according to claim 1 wherein said compressible and resilient material is elastomeric.

4. A floormat according to claim 3 wherein said topside has a non-slip upper surface.

5. A floormat according to claim 3 wherein said topside and said underside have non-slip surfaces.

6. A floormat according to claim 3 wherein said underside has an adhesive backing.

7. A floormat according to claim 3 comprising:

a plurality of suction cups under said floormat.

8. A floormat according to claim 7 wherein said suction cups are partially recessed in said floormat.

9. A floormat according to claim 1 wherein said compressible and resilient material comprises one or more of PVC and natural and synthetic rubber.

10. A floormat according to claim 1 wherein said compressible and resilient material comprises an anti-static material.

11. A floormat according to claim 1 wherein said channels are between ⅛ to << inch wide.

12. A floormat according to claim 1 wherein said border region is tapered.

* * * * *